United States Patent
Chang et al.

(10) Patent No.: US 12,039,968 B2
(45) Date of Patent: Jul. 16, 2024

(54) TARGET KEYWORD SELECTION

(71) Applicant: QUALCOMM Incorporated, San Diego, CA (US)

(72) Inventors: Wonil Chang, Seoul (KR); Jinseok Lee, Seoul (KR); Mingu Lee, Hwaseong (KR); Jinkyu Lee, Seoul (KR); Byeonggeun Kim, Seoul (KR); Dooyong Sung, Seoul (KR); Jae-Won Choi, Seoul (KR); Kyu Woong Hwang, Daejeon (KR)

(73) Assignee: QUALCOMM Incorporated, San Diego, CA (US)

( * ) Notice: Subject to any disclaimer, the term of this patent is extended or adjusted under 35 U.S.C. 154(b) by 223 days.

(21) Appl. No.: 17/038,887

(22) Filed: Sep. 30, 2020

(65) Prior Publication Data

US 2022/0101827 A1    Mar. 31, 2022

(51) Int. Cl.
| | |
|---|---|
| *G10L 15/00* | (2013.01) |
| *G10L 15/02* | (2006.01) |
| *G10L 15/22* | (2006.01) |
| *G10L 15/08* | (2006.01) |

(52) U.S. Cl.
CPC .............. *G10L 15/02* (2013.01); *G10L 15/22* (2013.01); *G10L 15/08* (2013.01)

(58) Field of Classification Search
CPC combination set(s) only.
See application file for complete search history.

(56) References Cited

U.S. PATENT DOCUMENTS

| | | | |
|---|---|---|---|
| 9,245,523 B2 * | 1/2016 | Wasserblat | G06F 16/60 |
| 9,412,374 B2 * | 8/2016 | Gruchalski | G01C 21/3608 |
| 9,892,729 B2 * | 2/2018 | Yun | G10L 15/08 |
| 10,133,546 B2 * | 11/2018 | Hart | G06F 3/167 |
| 10,249,298 B2 * | 4/2019 | Stajner | G10L 15/22 |
| 10,304,440 B1 | 5/2019 | Panchapagesan et al. | |
| 11,211,048 B2 * | 12/2021 | Kim | G10L 15/05 |

* cited by examiner

*Primary Examiner* — Vu B Hang
(74) *Attorney, Agent, or Firm* — QUALCOMM Incorporated

(57) ABSTRACT

System and method for operating an always-on ASR (automatic speech recognition) system by selecting target keywords and continuously detecting the selected target keywords in voice commands in a mobile device are provided. In the mobile device, a processor is configured to collect keyword candidates, collect usage frequency data for keywords in the keyword candidates, collect situational usage frequency data for the keywords in the keyword candidates, select target keywords from the keyword candidates based on the usage frequency data and the situational usage frequency data, and detect one or more of the target keywords in a voice command using continuous detection of the target keywords.

23 Claims, 5 Drawing Sheets

TARGET KEYWORD SELECTION

FIELD OF DISCLOSURE

Disclosed aspects are directed to selecting target keywords. More particularly, exemplary aspects are directed to operating an always-on automatic speech recognition (ASR) system by selecting target keywords and continuously detecting the selected target keywords in voice commands.

BACKGROUND

Voice user interfaces (UI) with ASR systems are getting popular in mobile and wearable devices for their ease of use and simplicity. In certain voice UIs, voice commands with certain keywords are used to activate the ASR systems. For example, such keyword as "Siri" may be used to activate an ASR system in a device before the device can process user's voice commands. After the ASR system wakes up, the ASR system may process the user's commands such as "find a nearby coffee shop". Keyword activated systems have lower power usage and less computation complexity than always-on ASR systems. However, in such systems, a wake-up keyword(s) is needed to activate the ASR system first, which may cause a delay in processing user's commands.

In other voice UIs with always-on ASR systems, a specific activation keyword, such as "Siri", is not used. However, such always-on ASR systems consume more power and increase computational complexities. However, most mobile and wearable devices have limited power supplies and limited hardware resources for voice UIs with always-on ASR systems. Thus, always-on ASR systems may not be feasible for mobile and wearable devices.

Accordingly, there is a need for systems and methods that provide an always-on ASR system that reduces power consumption and computational complexities.

SUMMARY

Exemplary aspects of the disclosure are directed to systems and methods for operating an always-on ASR system by selecting target keywords and continuously detecting the selected target keywords in voice commands. For example, an exemplary aspect is directed to a method of operating an automatic speech recognition (ASR) system in a mobile device, the method comprising: collecting keyword candidates; collecting usage frequency data for keywords in the keyword candidates; collecting situational usage frequency data for the keywords in the keyword candidates; selecting target keywords from the keyword candidates based on the usage frequency data and the situational usage frequency data; and detecting one or more of the target keywords in a voice command using continuous detection of the target keywords. The method further comprises: determining frequency scores for the keywords based on the usage frequency data and the situational usage frequency data; determining a confidence score for each of the detected keywords; processing each of the detected target keywords when the confidence score is higher than a threshold; adjusting the threshold when detection failure or false alarm occurs during the detection of the target keywords; executing the voice command directly when the voice command is a simple command; sending the voice command to an ASR module for execution when the voice command is a complex command; and storing the selected target keywords in a memory.

Another exemplary aspect is directed to a mobile device comprising: a memory; and a processor communicatively coupled to the memory, the processor configured to: collect keyword candidates; collect usage frequency data for keywords in the keyword candidates; collect situational usage frequency data for the keywords in the keyword candidates; select target keywords from the keyword candidates based on the usage frequency data and the situational usage frequency data; and detect one or more of the target keywords in a voice command using continuous detection of the target keywords. The processor is further configured to: determine frequency scores for the keywords based on the usage frequency data and the situational usage frequency data; determine a confidence score for each of the detected keywords; process each of the detected target keywords when the confidence score is higher than a threshold; adjust the threshold when detection failure or false alarm occurs during the detection of the target keywords; execute the voice command directly when the voice command is a simple command; send the voice command to an ASR module for execution when the voice command is a complex command; and store the selected target keywords in a memory.

Another exemplary aspect is directed to a mobile device comprising: means for collecting keyword candidates; means for collecting usage frequency data for keywords in the keyword candidates; means for collecting situational usage frequency data for the keywords in the keyword candidates; means for selecting target keywords from the keyword candidates based on the usage frequency data and the situational usage frequency data; and means for detecting one or more of the target keywords in a voice command using continuous detection of the target keywords. The method further comprises: means for determining frequency scores for the keywords based on the usage frequency data and the situational usage frequency data; means for determining a confidence score for each of the detected keywords; means for processing each of the detected target keywords when the confidence score is higher than a threshold; means for adjusting the threshold when detection failure or false alarm occurs during the detection of the target keywords; means for executing the voice command directly when the voice command is a simple command; means for sending the voice command to an ASR module for execution when the voice command is a complex command; and means for storing the selected target keywords in a memory.

Yet another exemplary aspect is directed to a non-transitory computer-readable storage medium comprising code, which, when executed by a processor, causes the processor to operate an automatic speech recognition (ASR) system, the non-transitory computer-readable storage medium comprising: code for collecting keyword candidates; code for collecting usage frequency data for keywords in the keyword candidates; code for collecting situational usage frequency data for the keywords in the keyword candidates; code for selecting target keywords from the keyword candidates based on the usage frequency data and the situational usage frequency data; and code for detecting one or more of the target keywords in a voice command using continuous detection of the target keywords. The storage medium further comprises: code for determining frequency scores for the keywords based on the usage frequency data and the situational usage frequency data; code for determining a confidence score for each of the detected keywords; code for processing each of the detected target keywords when the confidence score is higher than a threshold; code for adjusting the threshold when detection failure or false alarm occurs during the detection of the target keywords; code for executing the voice command directly when the voice command is a simple command; code for sending the voice command to an ASR module for execution when the voice command is a complex command; and code for storing the selected target keywords in a memory.

BRIEF DESCRIPTION OF THE DRAWINGS

The accompanying drawings are presented to aid in the description of aspects and are provided solely for illustration of the aspects and not limitation thereof.

DETAILED DESCRIPTION

Figure 1:
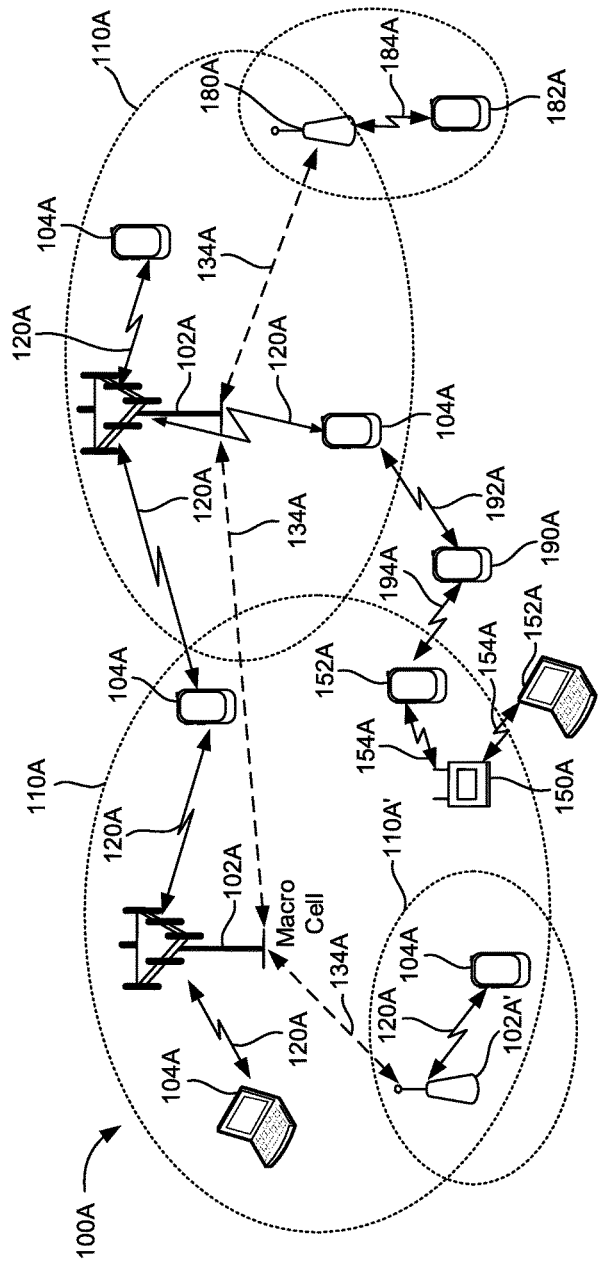
FIG. 1 illustrates an exemplary wireless communications system, according to various aspects

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts The word "exemplary" is used herein to mean "serving as an example, instance, or illustration." Any aspect described herein as "exemplary" is not necessarily to be construed as preferred or advantageous over other aspects. Likewise, the term "aspects of the disclosure" does not require that all aspects of the disclosure include the discussed feature, advantage or mode of operation.

The terminology used herein is for the purpose of describing particular aspects only and is not intended to be limiting of aspects of the disclosure. As used herein, the singular forms "a", "an", and "the", are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

Aspects of the present disclosure are directed to operating an always-on ASR system by collecting keyword candidates and selecting target keywords from the keyword candidates based on the usage of the keywords and the situational/environmental information that existed at the time of the usage. After the target keywords are selected, a keyword detector continuously or persistently detects the target keywords in voice commands and processes various commands in the voice commands. Other aspects of the present disclosure are directed to operating an ASR system that may not be an always-on ASR system but an ASR system that needs to be activated periodically.

According to various aspects, FIG. 1 illustrates an exemplary wireless communications system 100A. The wireless communications system 100A (which may also be referred to as a wireless wide area network (WWAN)) may include various base stations 102A and various UEs 104A. The base stations 102A may include macro cells (high power cellular base stations) and/or small cells (low power cellular base stations), wherein the macro cells may include Evolved NodeBs (eNBs), where the wireless communications system 100A corresponds to an LTE network, or gNodeBs (gNBs), where the wireless communications system 100A corresponds to a 5G network or a combination of both, and the small cells may include femtocells, picocells, microcells, etc.

The base stations 102A may collectively form a Radio Access Network (RAN) and interface with an Evolved Packet Core (EPC) or Next Generation Core (NGC) through backhaul links. In addition to other functions, the base stations 102A may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102A may communicate with each other directly or indirectly (e.g., through the EPC/NGC) over backhaul links 134A, which may be wired or wireless.

The base stations 102A may wirelessly communicate with the UEs 104A. Each of the base stations 102A may provide communication coverage for a respective geographic coverage area 110A. In an aspect, although not shown in FIG. 1A, geographic coverage areas 110A may be subdivided into a plurality of cells (e.g., three), or sectors, each cell corresponding to a single antenna or array of antennas of a base station 102A. As used herein, the term "cell" or "sector" may correspond to one of a plurality of cells of a base station 102A, or to the base station 102A itself, depending on the context.

While neighboring macro cell geographic coverage areas 110A may partially overlap (e.g., in a handover region), some of the geographic coverage areas 110A may be substantially overlapped by a larger geographic coverage area 110A. For example, a small cell base station 102A' may have a geographic coverage area 110A' that substantially overlaps with the geographic coverage area 110A of one or more macro cell base stations 102A. A network that includes both small cell and macro cells may be known as a heterogeneous network. A heterogeneous network may also include Home eNBs (HeNBs), which may provide service to a restricted group known as a closed subscriber group (CSG). The communication links 120A between the base stations 102A and the UEs 104A may include uplink (UL) (also referred to as reverse link) transmissions from a UE 104A to a base station 102A and/or downlink (DL) (also referred to as forward link) transmissions from a base station 102A to a UE 104A. The communication links 120A may use MIMO antenna technology, including spatial multiplexing, beamforming, and/or transmit diversity. The communication links may be through one or more carriers. Allocation of carriers may be asymmetric with respect to DL and UL (e.g., more or less carriers may be allocated for DL than for UL).

The wireless communications system 100A may further include a wireless local area network (WLAN) access point (AP) 150A in communication with WLAN stations (STAs) 152A via communication links 154A in an unlicensed frequency spectrum (e.g., 5 GHz). When communicating in an unlicensed frequency spectrum, the WLAN STAs 152A and/or the WLAN AP 150A may perform a clear channel assessment (CCA) prior to communicating in order to determine whether the channel is available.

The small cell base station 102A' may operate in a licensed and/or an unlicensed frequency spectrum. When operating in an unlicensed frequency spectrum, the small cell base station 102A' may employ LTE or 5G technology and use the same 5 GHz unlicensed frequency spectrum as used by the WLAN AP 150A. The small cell base station 102A', employing LTE/5G in an unlicensed frequency spectrum, may boost coverage to and/or increase capacity of the access network. LTE in an unlicensed spectrum may be referred to as LTE-unlicensed (LTE-U), licensed assisted access (LAA), or MulteFire.

The wireless communications system 100A may further include a mmW base station 180A that may operate in mmW frequencies and/or near mmW frequencies in communication with a UE 182A. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave (mmW). Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180A may utilize beamforming 184A with the UE 182A to compensate for the extremely high path loss and short range. Further, it will be appreciated that in alternative configurations, one or more base stations 102A may also transmit using mmW or near mmW and beamforming. Accordingly, it will be appreciated that the foregoing illustrations are merely examples and should not be construed to limit the various aspects disclosed herein.

The wireless communications system 100A may further include one or more UEs, such as UE 190A, that connects indirectly to one or more communication networks via one or more device-to-device (D2D) peer-to-peer (P2P) links. In the embodiment of FIG. 1, UE 190A has a D2D P2P link 192A with one of the UEs 104A connected to one of the base stations 102A (e.g., through which UE 190A may indirectly obtain cellular connectivity) and a D2D P2P link 194A with WLAN STA 152A connected to the WLAN AP 150A (through which UE 190A may indirectly obtain WLAN-based Internet connectivity). In an example, the D2D P2P links 192A-194A may be supported with any well-known D2D radio access technology (RAT), such as LTE Direct (LTE-D), WiFi Direct (WiFi-D), BLUETOOTH, and so on.

Figure 2:
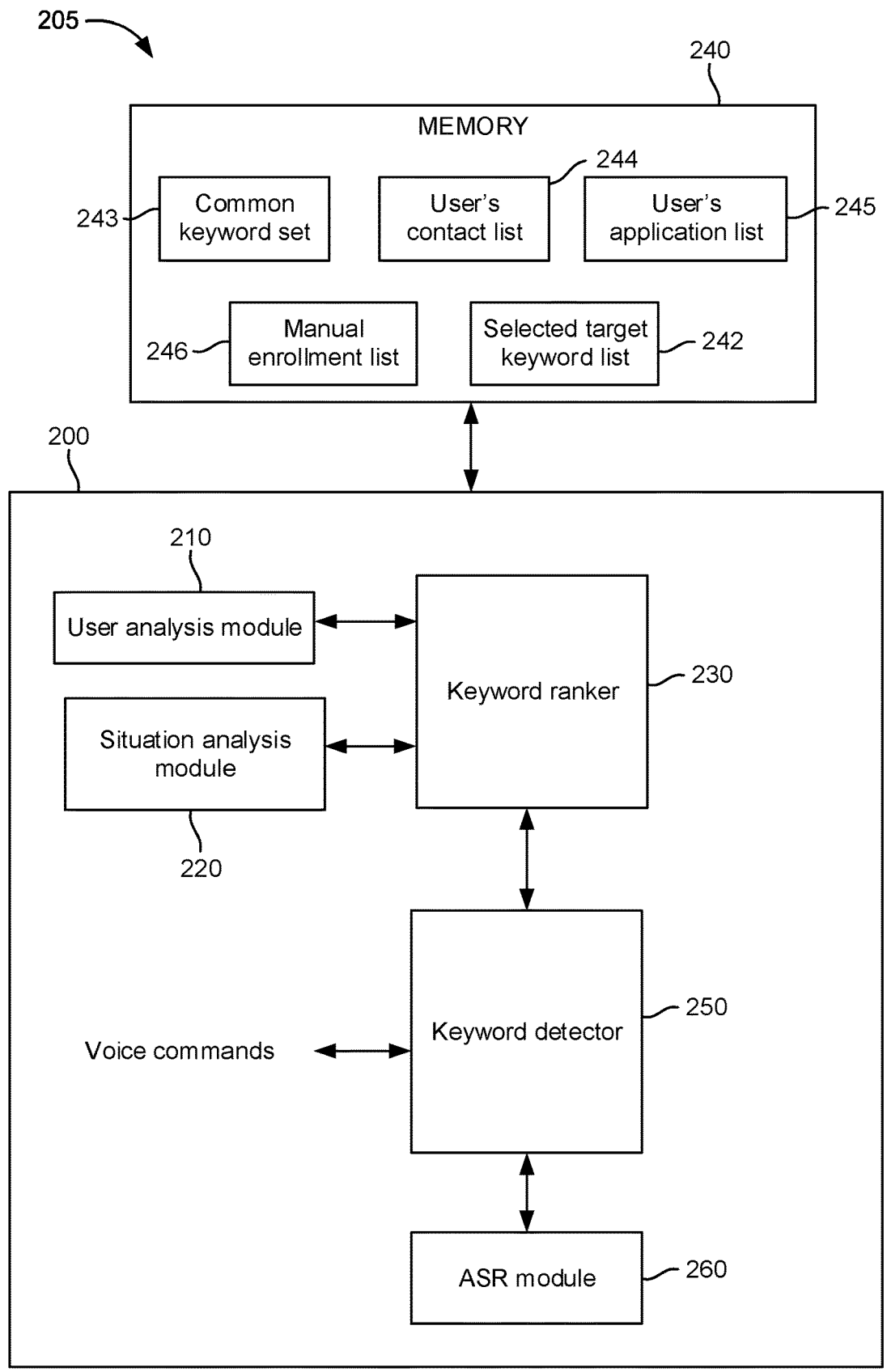
FIG. 2 illustrates an exemplary mobile device with an ASR system.

With reference to FIG. 2, a simplified schematic of an exemplary mobile device 205 with keyword processor 200 configured for collecting keyword candidates and selecting target keywords from the keyword candidates based on the usage of the keywords and the situational/environmental information that existed at the time of the usage is illustrated. Mobile device 205 further comprises memory 240. It will be noted that mobile device 205 may be similar to UE 104A or 190A shown in FIG. 1 and may further comprise one or more components as known to one skilled in the art, but which are not illustrated in FIG. 2.

Keyword processor 200 comprises user analysis module (UAM) 210, situation analysis module (SAM) 220, keyword ranker 230, keyword detector 250 and ASR module 260. As shown in FIG. 2, memory 240 stores selected target keyword list 242, common keyword set 243, user's contact list 244, user's application list 245 and manual enrollment list 246. User's contact list 244 may include the names of all of the contacts stored on mobile device 205. In an aspect, user's contact list 244 may include names stored on other devices or on the cloud. In addition, common keyword set 243 may store all of the common keywords that may be used in voice commands such as "play", "stop", "silent mode", "volume up/down", "message", "whether", "alarm", "calendar/schedule", etc. (This list of common keywords is not inclusive but just an example of common keywords.) User's application list 245 may store the names of the applications installed on mobile device 205. In an aspect, user's application list 245 may include the names of applications on other devices or on the cloud. Manual enrollment list 246 may store a list of keywords that have been entered by the user of mobile device 205.

Keyword ranker 230 may collect keyword candidates by collecting commonly used keywords such as "play", "stop", "silent mode", "volume up/down", "message", "whether", "alarm", "calendar/schedule", etc., and may store such commonly used keywords in common keyword set 243. Furthermore, keyword ranker 230 may collect contact names stored on mobile device 205, other devices used by the user and/or the cloud and may store the contact names in user's contact list 244. In addition, keyword ranker 230 may collect the names of applications installed on mobile device 205, other devices used by the user and/or on the cloud and store the application names in user's application list 245. Lastly, keyword ranker 230 may collect and store a list of keywords that have been entered by the user of mobile device 205. Keyword ranker 230 may store such keywords in manual enrollment list 246. All keywords collected by keyword ranker 230 and stored in common keyword set 243, user's contact list 244, user's application list 245 and manual enrollment list 246 form keyword candidates.

As shown in FIG. 2, UAM 210 is coupled to keyword ranker 230. UAM 210 may create a user log based on the usage of each of the keywords in the keyword candidates. In an aspect, UAM 210 may collect and record the usage of each of the keywords in the keyword candidates to create the user log. For example, if "John" is one of the keyword candidates stored in user's contact list 244, UAM 210 may record the usage of "John" in the user log whenever "John" is used in calls and text messages that were sent and received by mobile device 205. In another example, if "Yelp" is one of the keyword candidates stored in user's application list 245, UAM 210 may record the usages of the application "Yelp" in the user log. Thus, UAM 210 collects and records the usage of each of the keywords in the keyword candidates to create the user log. The user log may be stored in memory 240 or in UAM 210.

Furthermore, in an aspect, UAM 210 may determine the usage frequency for each of the keywords in the keyword candidates based on the data collected in the user log. The usage frequency may be calculated over a certain time period that may be fixed or changing. For example, if the keyword "John" was used five times in a day, then UAM 210 determines that the usage frequency for "John" is five in a day.

UAM 210 may determine the usage frequency for every keyword in user's contact list 244 by using the below formula:

$$C(i) = \frac{\text{\# of keyword } i \text{ (contact name)}}{\text{\# of total occurences of all contact names in phone calls and messages}}$$

where C(i)=how frequently keyword (i) (i.e., a particular contact name in the user's contact list 244) is used in phone calls and messages.

In addition, UAM 210 may determine the usage frequency for every keyword in common keyword set 243 and manual enrollment list 246. UAM 210 may determine the usage frequency of each of the keywords in common keyword set 243 and manual enrollment list 246 by using the following formula:

$$V(i) = \frac{\text{\# of keyword } i \text{ occurences in user's voice command log}}{\text{total \# of keyword } i \text{ occurence in user's voice command log}}$$

where V(i)=how frequently keyword (i) in common keyword set 243 and manual enrollment list 246 was used in user's voice command log (i.e., how frequently keyword (i) was used in voice commands on mobile device 205).

Third, UAM 210 may determine the usage frequency for every keyword in user's application list 245. UAM 210 may determine the usage frequency of each of the keywords in user's application list 245 by using the following formula:

$$A(i) = \frac{\text{\# of keyword } i \text{ (application) executions}}{\text{\# of total application executions}}$$

where A(i)=how frequently an application matching keyword (i) in user's application list 245 is executed on mobile device 205.

After collecting the usage frequency data described above, UAM 210 may store and transmit the collected data to keyword ranker 230. Keyword ranker 230 may analyze the received data for ranking various keywords as described below.

As shown in FIG. 2, situation analysis module (SAM) 220 is coupled to keyword ranker 230. In an aspect, SAM 220 may collect and record the environmental and situational information that existed around mobile device 205 when each of keywords in the keyword candidates was used as described above. SAM 220 may use the collected environmental and situational information and data to create a situation log. SAM 220 creates the situation log by recording the environmental and situational information that existed around mobile device 205 when each of keywords in the keyword candidates was used. SAM 220 may collect situational and environmental information such as location data, time of day data, day of the week data, network connection data, motion detector data, ambient light data and various other environmental and situational data surrounding mobile device 205 when each of the keywords was used.

For example, an user of mobile device 205 may call and receive phone calls and messages from different people based on the location of mobile device 205. When the user is staying at home, the user may call and receive phone calls from friends, whereas when the user is located at work, the user may call and receive phone calls from coworkers. SAM 220 records the location and the keywords (i.e., contact names) used at the location in the situation log.

In another example, the user may use different applications depending on the time of the day. The user may use game applications in the evening whereas the user may use business applications during the business hours. SAM 220 records the time and the keyword (i.e., an application name) used at the time.

As discussed above, SAM 220 may collect and record such situational and environmental information as location data, time of day data, day of the week data, network connection data, motion detector data, ambient light data and various other environmental and situational data that existed around mobile device 205 when each of the keywords was used. SAM 220 records the situational and environmental information in the situation log along with the used keywords. The above examples are not to be limiting, and various other detectors may be used to detect the environment and situations surrounding mobile device 205.

Furthermore, in an aspect, SAM 220 may determine how frequently each of the keywords is used in various situations and environment. In other words, SAM 220 may determine the usage frequency of each of the keywords in the keyword candidates based on the situational and the environmental information. The situational usage frequency of the keywords based on the situational and the environmental information may be expressed as C(i/s), V(i/s) and A(i/s). SAM 220 may record C(i/s), V(i/s) and A(i/s) in the situation log.

For example, SAM 220 may determine that contact name "John" was used three times in phone calls and messages while mobile device 205 was located at home, but contact name "Jerry" was used twice in phone calls while mobile device 205 was located at work. So, in this example, the controlling situation was the location of mobile device 205. The situational usage frequency of the keywords (the contact names) was dependent on the location of mobile device 205. SAM 220 records such data in the situation log.

In another example, a business application named "Calculator" may have been used twice during the business hours, but an application named "Shooting Game" may have been used once during the evening hours. So, in this example, the controlling situation was the time of the day when the applications were used. The situational usage frequency of the keywords (the application names) was dependent on the time of the day. SAM 220 records the situational usage frequency data in the situation log.

SAM 220 determines the situational usage frequency data based on the environment and situations surrounding mobile device 205 when keywords in the keyword candidates were used on mobile device 205. SAM 220 may transmit the situation log including the situational usage frequency data (C(i/s), V(i/s) and A(i/s)) to keyword ranker 230.

Keyword ranker 230 may receive the usage frequency data expressed as C(i), V(i) and A(i) from UAM 210 and may receive the situational usage frequency data expressed as C(i/s), V(i/s) and A(i/s) from SAM 220. Furthermore, keyword ranker 230 may access the keywords stored in common keyword set 243, user's contact list 244, user's application list 245 and manual enrollment list 246.

In an aspect, keyword ranker 230 may determine or calculate a frequency score for every keyword in the keyword candidates (i.e., keywords stored in common keyword set 243, user's contact list 244, user's application list 245 and manual enrollment list 246) based on the received usage frequency data C(i), V(i) and A(i) and the received situational usage frequency data C(i/s), V(i/s) and A(i/s). The frequency score for each of the keywords may be expressed as:

$$F(i)=f(C(i),V(i),A(i),C(i/s),V(i/s),A(i/s))$$

After determining the frequency scores for the keywords in the keyword candidates, keyword ranker 230 may rank the keywords based on the frequency score F(i). After keyword ranker 230 ranks the keywords, keyword ranker 230 may select a limited number of ranked keywords to create a list of selected target keywords. In an aspect, keyword ranker 230 may select keywords with the highest frequency scores to create the list of selected target keywords. The number of selected target keywords may depend on a predetermined number or may be dependent on a dynamic number that changes based on the situation and the environment surrounding mobile device 205.

After selecting the target keywords, the keyword ranker 230 may store the selected target keywords in selected keyword list 242. Keyword ranker 230 may select new target keywords based on the changes in the situations and environment surrounding mobile device 205.

Keyword detector 250 is coupled to memory 240 and may access selected target keyword list 242 in memory 240. In an aspect, keyword detector 250 may be an always-on multi keyword detector that continuously or persistently monitors for the selected target keywords in the list 242 in voice commands spoken by the user of mobile device 205. Keyword detector 250 may use the selected target keywords in selected target keyword list 242 to continuously monitor for the selected target keywords in the user's voice commands. Keyword detector 250 may function as an always-on multi keyword detector that continuously or persistently monitors for the selected target keywords in voice commands spoken by the user of mobile device 205. In an aspect, keyword detector 250 may function as a periodical multi keyword detector that periodically monitors for the selected target keywords in voice commands spoken by the user of mobile device 205 instead of continuously monitoring for the selected target keywords.

In an aspect, whenever keyword detector 250 detects a keyword that may match one of the selected target keywords, keyword detector 250 may calculate or determine a confidence score D(i/s) for that keyword. The confidence score D(i/s) indicates how well the detected keyword matches one of the selected target keywords. For example, if the user issues a voice command that says "call John" and the keyword "John" is one of the selected target keywords, keyword detector 250 determines how well the spoken word "John" matches the keyword "John" in the selected target keyword list 242 by calculating the confidence score D(i/s).

Keyword detector 250 may proceed with the processing of the detected keyword only if the confidence score for the detected keyword is higher than a threshold Θ(i/s). In an aspect, every keyword in the selected target keyword list 242 has a threshold Θ(i/s). Keyword detector 250 may raise the threshold Θ(i/s) if there is a failure to correctly detect the keyword (i) spoken in a voice command. In addition, keyword detector 250 may lower the threshold Θ(i/s) if there is a false alarm while detecting the keyword (i) spoken in a voice command.

After keyword detector 250 determines that D(i/s) of a detected keyword (i) in a voice command is higher than the threshold Θ(i/s), keyword detector 250 may process the detected keyword (i) and execute the voice command.

In an aspect, keyword detector 250 may directly execute simple keyword commands such as "weather", "calendar" or "silent mode", etc. Keyword detector may send more complicated or longer commands and sentences to ASR module 260 for processing and execution.

ASR module 260 is coupled to keyword detector 250 and may process voice commands received from keyword detector 250. In an aspect, ASR module 260 may execute the voice commands that have been processed. In another aspect, ASR module 260 may send the interpretation of the voice commands to another processor (not shown) to be executed.

Figure 3A:
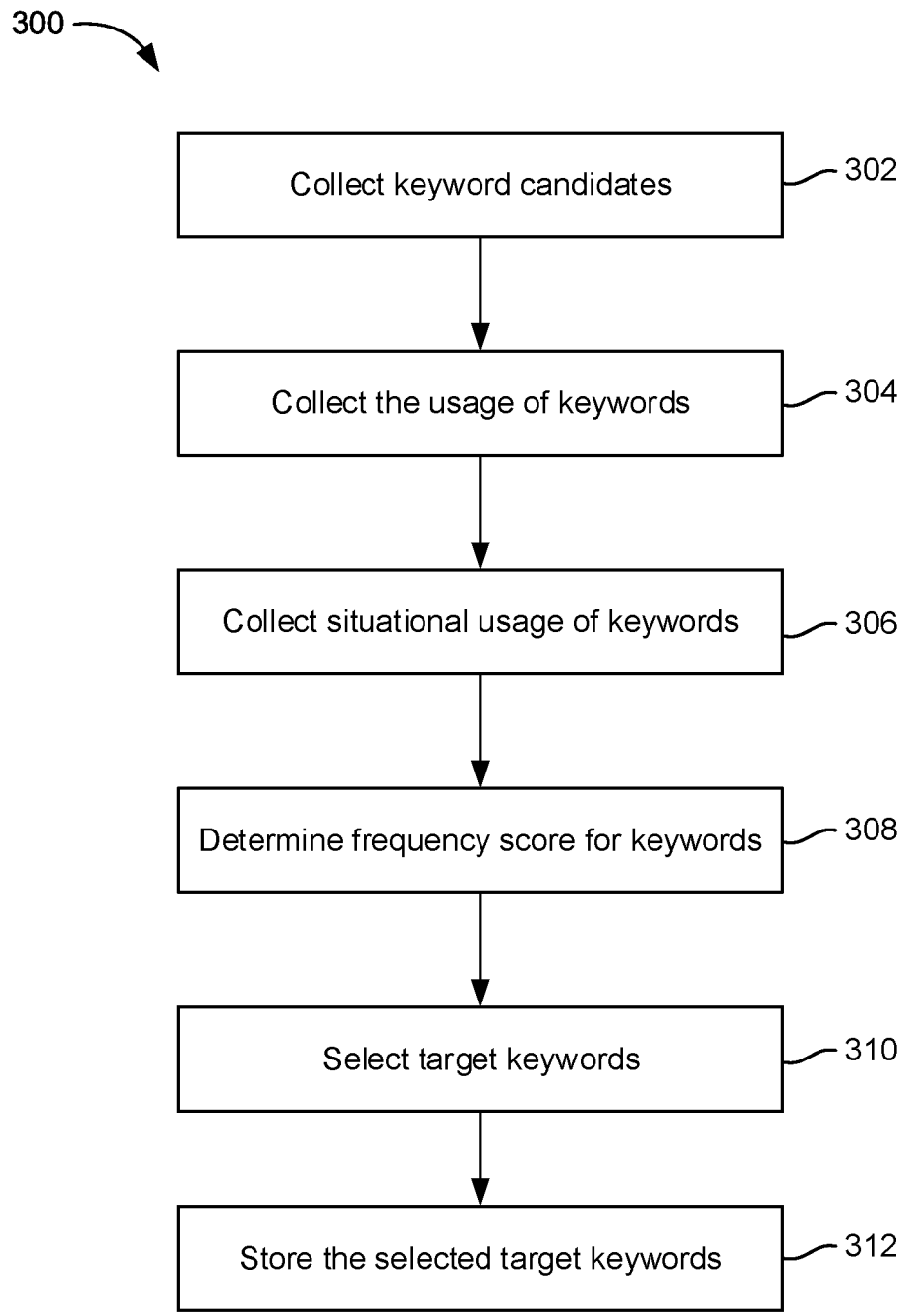
FIGS. 3A-3B illustrate flowcharts corresponding to one or more methods of operating an ASR system, according to various aspects of the disclosure.
Figure 3B:
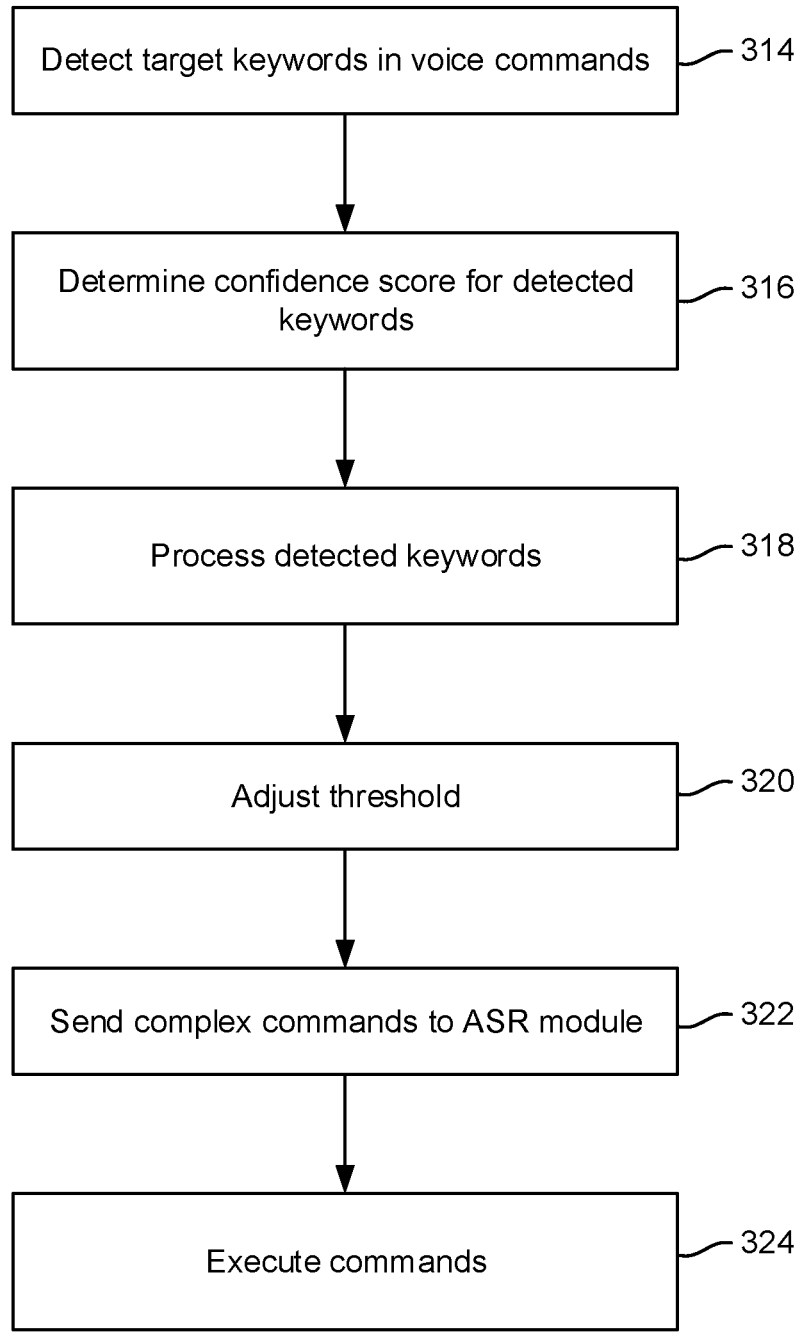

It will be appreciated that aspects include various methods for performing the processes, functions and/or algorithms disclosed herein. For example, FIGS. 3A and 3B show a method 300 for operating an always-on ASR system by collecting keyword candidates and selecting target keywords from the keyword candidates based on the usage of the keywords and the situational/environmental information that existed at the time of the usage. The method may be performed by a device such as mobile device 205, keyword processor 200 and UE 104A. In one configuration, the method 300 described in FIGS. 3A and 3B may be performed by mobile device 400 described below with reference to FIG. 4.

At block 302, the method collects keyword candidates. The keyword candidates may come from common keyword list, names in a contact list, application installed on mobile device 205 and keywords that have been enrolled by the user of mobile device 205. Keyword ranker 230 may collect the keywords candidates. Keyword ranker 230 may store the collected keyword candidate in memory 240.

At block 304, the method collects and records the usage of each of the keywords in the keyword candidates to create the user log. UAM 210 may create the user log based on the usage of each of the keywords in the keyword candidates. UAM 210 may determine the usage frequency for every keyword in the keyword candidates and record the usage frequency in the user log.

At block 306, the method collects and records the usage of each of the keywords in the keyword candidates based on the situations and the environment surrounding mobile device 205 when the keywords were used on mobile device 205. SAM 220 may create a situation log based on the situations and the environment surrounding mobile device 205 when the keywords in the keyword candidates were used on mobile device 205. SAM 220 may determine the situational usage frequency data based on the environment and situations surrounding mobile device 205 when keywords in the keyword candidates were used on mobile device 205. SAM 220 may record the situational usage frequency data in the situation log.

At block 308, the method determines the frequency score for each of the keywords in the keyword candidates based on the user log and the situation log. Keyword ranker 230 may determine the frequency score for each of the keywords based on the usage frequency data and the situational usage frequency data.

At block 310, the method selects target keywords based on the frequency score for each of the keywords. Keyword ranker 230 may rank the keywords in the keyword candidates based on the frequency score and select the target keywords based on the frequency score rank of the keywords. The number of selected keywords may depend on a predetermined number or a dynamic number.

At block 312, the method stores the selected target keywords in memory 240. Keyword ranker 230 may store the selected target keywords in selected target keyword list 242.

At block 314, the method continuously detects the selected target keywords in voice commands by using the selected target keywords. Keyword detector 250 may continuously monitor and detect keywords in voice commands from the user of mobile device 205 by using the selected target keywords.

At block 316, the method determines a confidence score for each of the detected keywords in the voice commands. Keyword detector 250 may determine the confidence score for each of the detected keywords in the voice commands.

At block 318, the method processes detected keywords in voice commands if the confidence scores for the detected keywords exceed the respective threshold. Keyword detector 250 may proceed with the processing of the detected keywords only if the confidence scores for the detected keywords are higher than the respective threshold $\Theta(i/s)$.

At block 320, the method adjusts the respective confidence score threshold for the detected keywords based on detection failures and false alarms. Keyword detector 250 may raise the threshold of a detected keyword if there is a failure to correctly detect the keyword spoken in a voice command. In addition, keyword detector 250 may lower the threshold if there is a false alarm while detecting the keyword.

At block 322, the method sends long or complicated voice commands to an ASR module for processing and execution. Keyword detector 250 may send long or complicated voice commands to ASR module 260 for processing and execution.

At block 324, the method executes the commands in the detected voice commands. Keyword detector 250 may execute simple commands, but ASR module 260 may execute long or complicated commands.

Figure 4:
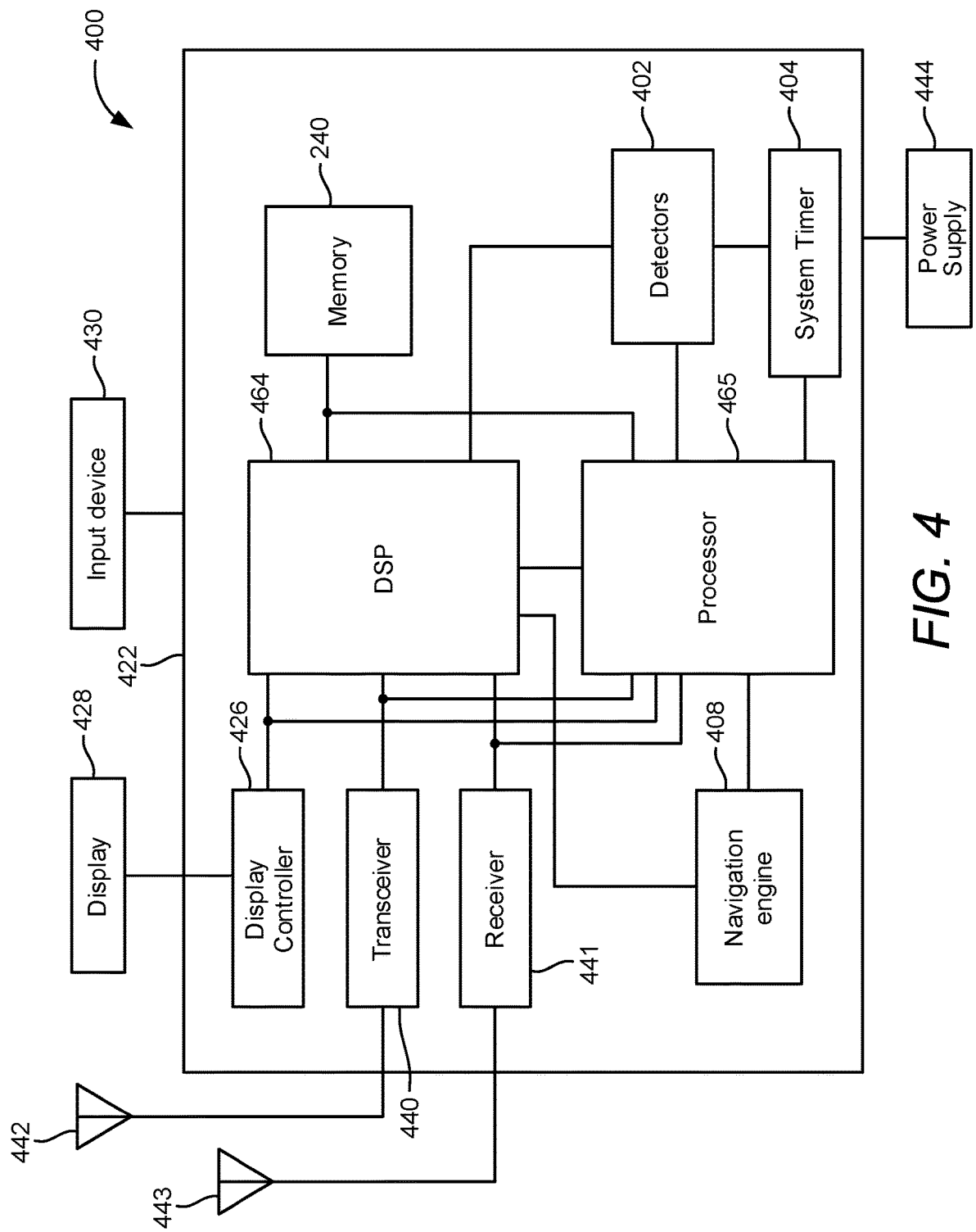
FIG. 4 illustrates an exemplary implementation of a wireless communication device configured for operating an ASR system according to various aspects of the disclosure.

With reference now to FIG. 4, another exemplary device 400 implemented as a wireless communication system is illustrated. Device 400 is similar to mobile device 205 and UE 104A in many exemplary aspects, and the depiction and description of device 400 includes various additional exemplary components not shown with relation to mobile device 205 and UE 104A shown in FIGS. 1 and 2. As shown in FIG. 4, device 400 includes digital signal processor (DSP) 464 and a general purpose processor, depicted as processor 465. The above-described functions and methods related to operating an always-on ASR system by selecting target keywords and continuously detecting the selected target keywords in voice commands can be performed in DSP 464 or processor 465 or any combination of the processing elements thereof. Accordingly, in some aspects, processor 465 may be configured to perform operations described with regard to keyword processor 200, but it will be understood that some of the operations related to operating the always-on ASR system can be performed in DSP 464, and moreover, these operations can be implemented in any suitable combination of hardware and software. In some aspects, processor 465 may be configured to operate an ASR system that may not be an always-on ASR system but an ASR system that needs to be activated periodically. Both DSP 464 and processor 465 may be coupled to memory 240. Navigation engine 408 can be coupled to DSP 464 and processor 465 and used to provide location data to DSP 464 and processor 465. Detectors 402 can be coupled to DSP 464 and processor 465 and provide environmental and situational information to DSP 464 and processor 465 such as ambient light, motion detection and network connection. Display controller 426 can be coupled to DSP 464, processor 465, and to display 428. Other components, such as transceiver 440 (which may be part of a modem) and receiver 441 are also illustrated. Transceiver 440 can be coupled to wireless antenna 442, which may be configured to receive wireless signals from a calibrated terrestrial source such as WWAN, CDMA, etc. Receiver 441 can be coupled to a satellite or GNSS antenna 443, which may be configured to receive wireless signals from satellites or GNSS signals. System timer 404 is also illustrated and may provide timing signals to DSP 464 and processor 465 to determine time of the day or other time related data. In a particular aspect, DSP 464, processor 465, display controller 426, memory 240, navigation engine 408, transceiver 440, receiver 441, detector 402, and system timer 404 are included in a system-in-package or system-on-chip device 422.

In a particular aspect, input device 430 and power supply 444 are coupled to the system-on-chip device 422. Moreover, in a particular aspect, as illustrated in FIG. 4, display 428, input device 430, wireless antenna 442, GNSS antenna 443, and power supply 444 are external to the system-on-chip device 422. However, each of display 428, input device 430, wireless antenna 442, GNSS antenna 443, and power supply 444 can be coupled to a component of the system-on-chip device 422, such as an interface or a controller.

In one aspect, one or both of DSP 464 and processor 465, in conjunction with one or more remaining components illustrated in FIG. 4, can include logic/means to operate an ASR system by selecting target keywords and continuously detecting the selected target keywords in voice commands as discussed, for example, in Blocks 302-324 of FIGS. 3A and 3B. For example, DSP 464, keyword processor 200 and/or processor 465 can include logic/means to implement functions related to collecting keyword candidates; collecting usage frequency data for keywords in the keyword candidates; collecting situational usage frequency data for the keywords in the keyword candidates; selecting target keywords from the keyword candidates based on the usage frequency data and the situational usage frequency data; detecting one or more of the target keywords in a voice command using continuous detection of the target keywords; determining frequency scores for the keywords based on the usage frequency data and the situational usage frequency data; determining a confidence score for each of the detected keywords; and processing each of the detected target keywords when the confidence score is higher than a threshold.

It should be noted that although FIG. 4 depicts a wireless communications device, DSP 464, processor 465, and memory 240 may also be integrated into a device, selected from the group consisting of a set-top box, a music player, a video player, an entertainment unit, a navigation device, a communications device, a personal digital assistant (PDA), a fixed location data unit, or a computer. Moreover, such a device may also be integrated in a semiconductor die.

Accordingly it will be appreciated from the foregoing that at least one aspect includes a mobile device having a memory and a processor configured to: collect keyword candidates; collect usage frequency data for keywords in the keyword candidates; collect situational usage frequency data for the keywords in the keyword candidates; select target keywords from the keyword candidates based on the usage frequency data and the situational usage frequency data; and detect one or more of the target keywords in a voice command using continuous detection of the target keywords.

The various aspects disclosed advantageously allows the mobile device to operate an ASR system by selecting target keywords and continuously detecting the selected target keywords in voice commands.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methods, sequences and/or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an aspect of the disclosure can include a computer readable media embodying a method for operating an automatic speech recognition (ASR) system. Accordingly, the disclosure is not limited to illustrated examples and any means for performing the functionality described herein are included in aspects of the disclosure.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

The foregoing disclosed devices and methods are typically designed and are configured into GDSII and GERBER computer files, stored on a computer readable media. These files are in turn provided to fabrication handlers who fabricate devices based on these files. The resulting products are semiconductor wafers that are then cut into semiconductor die and packaged into a semiconductor chip. The chips are then employed in devices described above.

What is claimed is:

1. A method of operating an automatic speech recognition (ASR) system in a mobile device, the method comprising:
   collecting keyword candidates;
   collecting usage frequency data for keywords in the keyword candidates;
   collecting situational usage frequency data for the keywords in the keyword candidates;
   selecting target keywords from the keyword candidates based on the usage frequency data and the situational usage frequency data;
   detecting, by a keyword detector of the mobile device, one or more of the target keywords in a voice command using continuous detection of the target keywords; and
   processing, by the keyword detector, the voice command based on the detected one or more of the target keywords, including:
      execution of the voice command in a case that the voice command, based on the detected one or more of the target keywords, is a keyword command executable by the keyword detector; and
      sending of the voice command to an ASR module of the mobile device for execution or further processing in a case that the voice command, based on the detected one or more of the target keywords, is not executable by the keyword detector.

2. The method of claim 1, further comprising:
   determining frequency scores for the keywords in the keyword candidates based on the usage frequency data and the situational usage frequency data.

3. The method of claim 2, wherein the target keywords are selected based on the frequency scores.

4. The method of claim 1, further comprising:
   determining a confidence score for each of the detected one or more of the target keywords.

5. The method of claim 4, further comprising:
   processing each of the detected one or more of the target keywords when the confidence score is higher than a threshold.

6. The method of claim 5, further comprising:
   adjusting the threshold when a detection failure or false alarm occurs during the detection of the target keywords.

7. The method of claim 1, further comprising:
   storing the target keywords in a memory.

8. The method of claim 1, wherein the keyword candidates comprise one or more of: names in a contact list, names of applications installed on the mobile device, common keywords or manually enrolled keywords.

9. The method of claim 1, wherein the situational usage frequency data includes data related to situations surrounding the mobile device when the keywords in the keyword candidates were used on the mobile device.

10. A mobile device comprising:
a memory; and
a processor communicatively coupled to the memory, the processor configured to:
    collect keyword candidates;
    collect usage frequency data for keywords in the keyword candidates;
    collect situational usage frequency data for the keywords in the keyword candidates;
    select target keywords from the keyword candidates based on the usage frequency data and the situational usage frequency data;
    detect, by a keyword detector of the processor, one or more of the target keywords in a voice command using continuous detection of the target keywords;
    process, by the keyword detector, the voice command based on the detected one or more of the target keywords, including:
        execution of the voice command in a case that the voice command, based on the detected one or more of the target keywords, is a keyword command executable by the keyword detector; and
        sending of the voice command to an ASR module of the mobile device for execution or further processing in a case that the voice command, based on the detected one or more of the target keywords, is not executable by the keyword detector.

11. The mobile device of claim 10, wherein the processor is configured to determine frequency scores for the keywords based on the usage frequency data and the situational usage frequency data.

12. The mobile device of claim 11, wherein the target keywords are selected based on the frequency scores.

13. The mobile device of claim 10, wherein the processor is configured to determine a confidence score for each of the detected one or more of the target keywords.

14. The mobile device of claim 13, wherein the processor is configured to process each of the detected one or more of the target keywords when the confidence score is higher than a threshold.

15. The mobile device of claim 14, wherein the processor is configured to adjust the threshold when a detection failure or false alarm occurs during the detection of the target keywords.

16. The mobile device of claim 10, wherein the processor is configured to store the target keywords in the memory.

17. The mobile device of claim 10, wherein the keyword candidates comprise one or more of: names in a contact list, names of applications installed on the mobile device, common keywords or manually enrolled keywords.

18. The mobile device of claim 10, wherein the situational usage frequency data includes data related to situations surrounding the mobile device when the keywords in the keyword candidates were used on the mobile device.

19. A non-transitory computer-readable storage medium comprising code, which, when executed by a processor of a mobile device, causes the processor to operate an automatic speech recognition (ASR) system, the non-transitory computer-readable storage medium comprising:
    code for collecting keyword candidates;
    code for collecting usage frequency data for keywords in the keyword candidates;
    code for collecting situational usage frequency data for the keywords in the keyword candidates;
    code for selecting target keywords from the keyword candidates based on the usage frequency data and the situational usage frequency data;
    code for detecting, by a keyword detector of the processor, one or more of the target keywords in a voice command using continuous detection of the target keywords; and
    code for processing, by the keyword detector, the voice command based on the detected one or more of the target keywords, including:
        execution of the voice command in a case that the voice command, based on the detected one or more of the target keywords, is a keyword command executable by the keyword detector; and
        sending of the voice command to an ASR module of the mobile device for execution or further processing in a case that the voice command based on the detected one or more of the target keywords is not executable by the keyword detector.

20. The non-transitory computer-readable storage medium of claim 19, further comprising:
    code for determining frequency scores for the keywords in the keyword candidates based on the usage frequency data and the situational usage frequency data.

21. The non-transitory computer-readable storage medium of claim 20, wherein the target keywords are selected based on the frequency scores.

22. The non-transitory computer-readable storage medium of claim 19, further comprising:
    code for determining a confidence score for each of the detected one or more of the target keywords; and
    code for processing each of the detected one or more of the target keywords when the confidence score is higher than a threshold.

23. The non-transitory computer-readable storage medium of claim 19, wherein the situational usage frequency data includes data related to situations surrounding the processor when the keywords in the keyword candidates were used.

* * * * *